Dec. 5, 1961                J. G. CANNON                 3,011,655
            DRAFT APPARATUS WITH IMPROVED NON-BREAKABLE
                    EMERGENCY RELEASE MEANS
Filed March 14, 1960                              2 Sheets-Sheet 1

INVENTOR.
JOHN G. CANNON
BY
*Henry E Otto Jr*
ATTORNEY

Dec. 5, 1961   J. G. CANNON   3,011,655
DRAFT APPARATUS WITH IMPROVED NON-BREAKABLE
EMERGENCY RELEASE MEANS
Filed March 14, 1960   2 Sheets-Sheet 2

INVENTOR.
JOHN G. CANNON
BY Henry E. Otto Jr.
ATTORNEY

United States Patent Office 3,011,655
Patented Dec. 5, 1961

3,011,655
DRAFT APPARATUS WITH IMPROVED NON-BREAKABLE EMERGENCY RELEASE MEANS
John G. Cannon, Pittsburgh, Pa., assignor to Westinghouse Air Brake Company, Wilmerding, Pa., a corporation of Pennsylvania
Filed Mar. 14, 1960, Ser. No. 14,605
10 Claims. (Cl. 213—1)

This invention relates to draft apparatus for transmitting draft and buffing forces between two vehicles, such as railway cars, and embodying emergency release means which, without breaking, permits substantial shortening of the draft apparatus in response to a buffing force exceeding a predetermined high value. The invention relates more particularly to draft apparatus embodying an improved emergency release means of the above general type comprising parts which move relative to each other only when buffing forces exceed said high value, thereby substantially reducing wear of said parts.

In the copending application, U.S. Serial No. 9,603, of Cannon and Morris assigned to the assignee of the present invention, there is disclosed a draft apparatus embodying an emergency release means of the above general type. This draft apparatus comprises, briefly, two telescopically arranged members connected to the respective vehicle; resilient means interposed between said members for transmitting draft and buffing forces therebetween; and an emergency release means including latch means, in the form of balls, normally maintained latched to one of the members by contact with a latch control element. Buffing forces are normally transmitted between the members via the latched balls and the resilient means. When buffing forces exceed a predetermined high value, however, the latch control element, which is positively secured to said other member, will be moved far enough toward said one member to carry said control element to an abnormal position in which it permits the latching balls to be cammed into recess means provided in said control element. This will effectively disengage the latching balls from said one member and permit substantial shortening of the draft apparatus so that the anti-climber plates at the adjacent ends of the vehicles may engage and take the thrust and prevent or at least inhibit telescoping of the vehicles. While this emergency release means operates satisfactorily, it will be apparent that due to the positive connection of the latch control element to said other member, said element will move in contact with and hence can wear the balls during buffing forces less than said high value and thereby reduce the useful life of the emergency release means.

The principal object of this invention is therefore to provide a draft apparatus embodying an improved emergency release means of the non-breakable type wherein wear of the balls and control element is positively eliminated not only during draft forces but also during buffing forces of less than said high value so that said release means will last indefinitely.

According to this object, the draft apparatus with the improved emergency release means comprises a latch control element which is movable relative to (rather than being positively connected to) said other member and is spring biased to a normal position in which it is spaced from said one member and maintains the balls latched to said one member, said control element being moved from normal position to abnormal position only upon movement of said members relatively toward each other in excess of a predetermined distance corresponding to a buffing force exceeding said high value. With this arrangement, wear of the balls and control element will be reduced substantially because no movement of these parts will occur except during abnormally high buffing forces. The terms "normal position' and "abnormal position" as employed hereinafter in the specificaion to describe the location of the elements of the draft apparatus are intended to define, respectively, the location of the parts when the draft and buffing forces below a predetermined high value are transmitted therethrough, and the location of the parts when buffing forces exceeding the predetermined high value are transmitted therethrough.

According to one embodiment of the invention, the latch control element is biased to normal position by a spring that bears against a portion of said other member so that upon unlatching of the balls from said one member, the action of said spring will be nullified because both of its ends will operatively bear against spaced portions of said other member. With this arrangement, the draft apparatus will remain indefinitely in its shortened or unlatched condition until the release means is restored to its normal or latched condition by application of a draft force to either of the members.

According to another embodiment of the invention, the control element is biased to normal position by a spring that bears against said one member. With this arrangement, upon contact of the control element by said other member, the control element will be shifted against resistance of said spring for thereby, if the force of said spring is significant, absorbing some of the buffing shock. Also, if the spring is of sufficient value, it can tend to restore the emergency release means to its normal or latched condition as soon as the buffing shock is dissipated.

Other objects and advantages become apparent from the following more detailed description of the invention and from the accompanying drawings, wherein.

Figure 1:
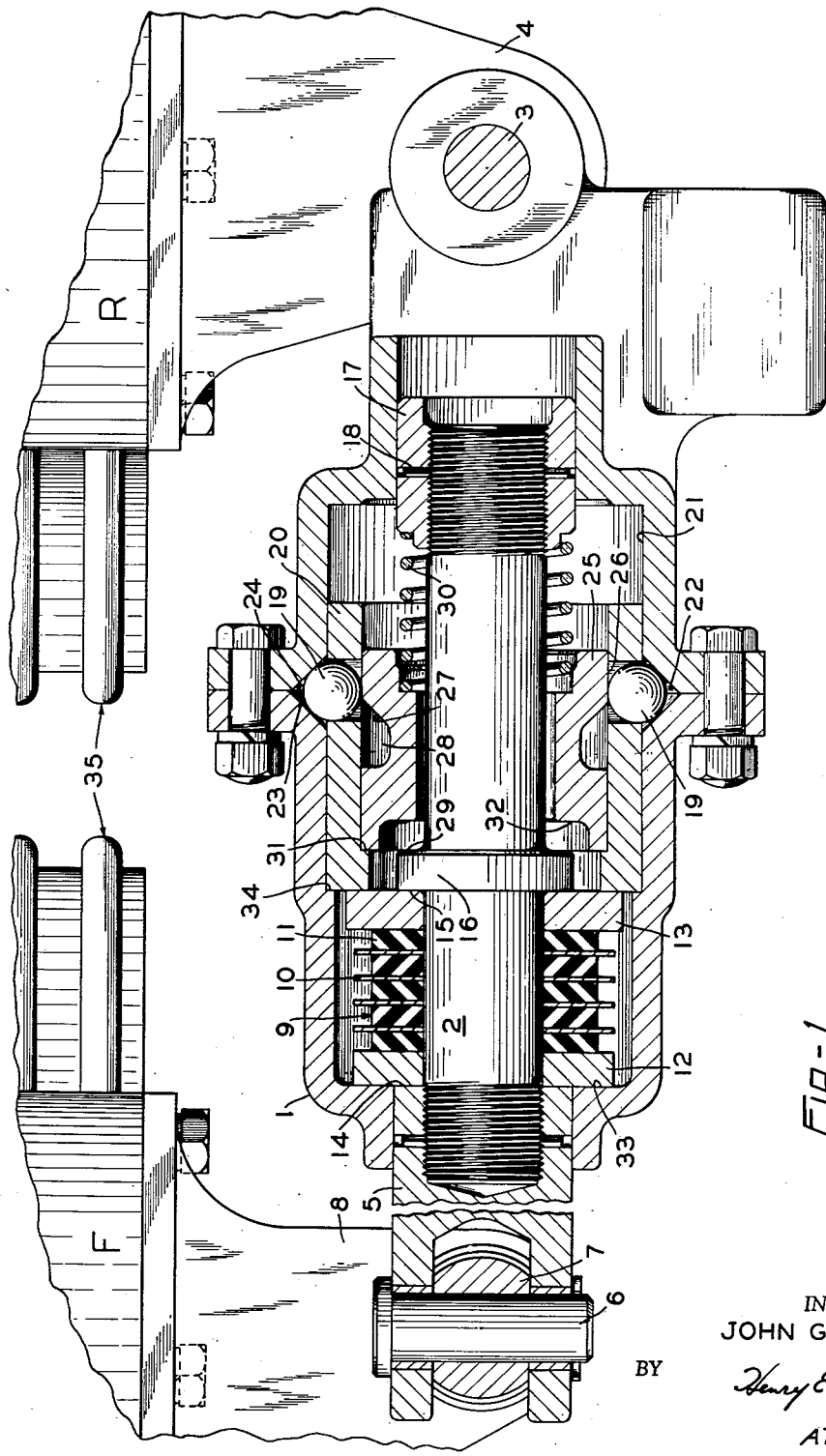
FIG. 1 is an elevation view, partly in section and partly in outline, showing portions of two railway cars connected by a draft apparatus having an emergency release means constructed according to one embodiment of the invention and shown in a normal position.
Figure 2:
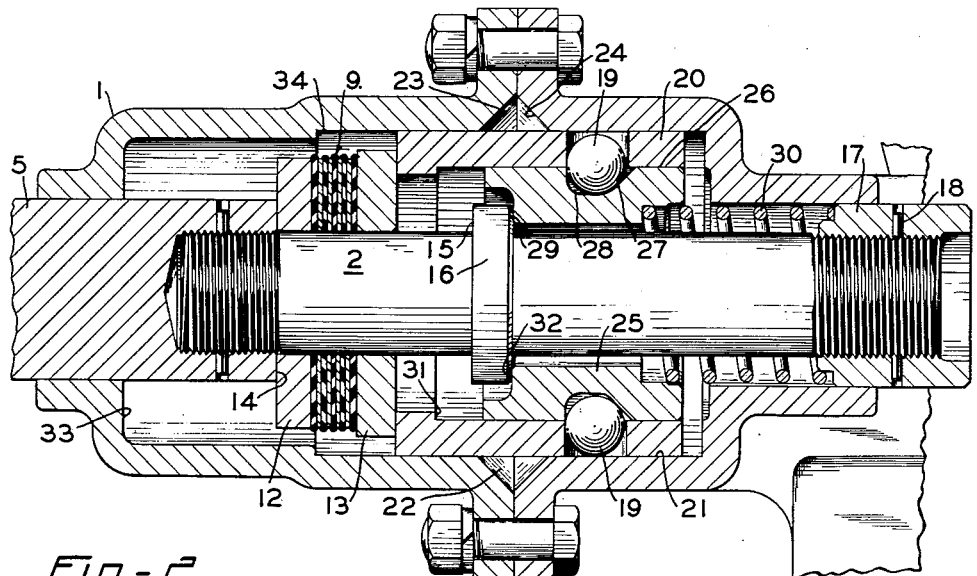
FIG. 2 is a partial section view of the draft apparatus of FIG. 1 showing the release means in a shortened or unlatched condition assumed when buffing force exceeds a predetermined high value.

*Description—FIGS. 1 and 2*

As shown in these figures, the draft apparatus embodying the invention comprises two telescopically arranged members 1, 2 respectively connected at their remote ends to adjacent railroad cars F and R in any suitable manner. For example, member 1, which is in the form of a hollow sectionalized body, may be pivotally connected by a horizontal pin 3 to an anchor 4 dependingly secured to the body of car R; and member 2, which is in the form of a draw bar or rod telescopically extending into body 1, may be coaxially connected at its outwardly projecting end via a clevis 5 to a pin 6 carried by a shaft 7 that is rotatably disposed in an anchor 8 dependingly secured to the body of car F.

Draft and the buffing forces are transmitted between the cars F and R by structure forming part of the draft apparatus and including a resilient means 9 preferably in the form of a sandwich comprising alternately arranged metal washers, like 10, and axially compressible rubber washers, like 11, or if preferred, in the form of an axially compressible helical spring (not shown). In any event, means 9 and also two thrust washers 12, 13 at opposite ends thereof encircle rod 2 and are disposed between two radial shoulders 14, 15. Shoulder 14 is preferably provided by the inner end of clevis 5, which clevis has slidably guided contact with an aligned bore through an end wall of the body 1. At its end opposite the clevis 5, rod 2 also has an enlarged diameter portion 17 which has slidably guided contact with the wall of an aligned bore provided in the body and is preferably in the form of a nut screwed over said end and staked in place by a transverse pin 18.

Latch means is provided, preferably in the form of a plurality of balls 19 partially disposed in and projecting exteriorly of respective circumferentially spaced holes cut through the wall of an annular cage 20 that at one end is adapted to abut washer 13. The cage 20 concentrically surrounds rod 2 and is axially reciprocable in an aligned bore 21 provided in body 1. The balls 19 normally project radially outward of the cage 20 and into a notch 22 cut into the wall of bore 21 and preferably in the shape of a V provided by the beveled ends 23, 24 of two abutting sections of the sectionalized body 1. An annular latch control element 25 is slidably reciprocable within cage 20 and provides an outer cylindrical surface 26 which normally contacts the balls 19 to hold them in the notch 22 and in a latching position in which, as shown in FIG. 1, said balls acting through cage 20 will prevent rightward movement of the washer 13 relative to the body 1 during buffing forces below a predetermined high value, for reasons which will subsequently become apparent. In the outer surface of the element 25 and joining surface 26 is an inclined cam surface 27 defining the adjacent side of an annular recess 28. Recess 28 is deep enough, when the balls 19 are disposed therein and in an unlatching position as shown in FIG. 2, to cause said balls to lie radially inward of bore 20.

With the balls 19 in latching position (FIG. 1), their centers lie in an imaginary circle having a diameter equal to or preferably slightly less than that of bore 20 to assure that said balls can, by contact with beveled cam-surface-providing end 24, be cammed into recess 28 by the power transmitted from resilient means 9 to said balls via washer 13 and cage 20 during an abnormally high buffing force sufficient to cause the recess to be brought into substantial transverse alignment with said balls. With the balls 19 in unlatching position (FIG. 2), their centers lie in an imaginary circle having a diameter equal to or preferably greater than that of the cylindrical surface 26, so that said balls can be cammed out of the recess 28 by cam surface 27 upon application of a draft force to one of the members 1, 2, as will be understood from subsequent description.

The arrangement as thus far described corresponds to the embodiment disclosed in FIGS. 1 and 2 of the drawings of the aforementioned copending application.

According to the invention, the surface 15 is provided by one side of a collar 16 rigidly connected to rod 2 rather than by one end of the control element as in the prior arrangement of the aforementioned copending application; and the latch control element 25 surrounds, with radial clearance, that portion of rod 2 between the opposite side or end 29 of collar 16 and the enlarged diameter portion 17 of rod 2. Element 25 is biased by a helical spring 30 to a normal position, preferably defined by contact with an inwardly directed shoulder 31 on cage 20. In this position, a surface 32 of element 25 is spaced a predetermined distance from side 29. Spring 30 bears against a seat provided by enlarged rod portion 17 and is of sufficient strength to cam the balls 19 outwardly of recess 28, in the manner presently to be described.

In operation, assuming that neither of the members 1, 2 is subjected to draft or buffing forces and that the draft apparatus has not just previously been subjected to a buffing force exceeding a predetermined high value, the various components of said apparatus will assume the respective positions in which they are shown in FIG. 1.

During draft forces, the car F will move relatively away from car R and operatively cause rod 2 to be moved outwardly relative to the body 1. Draft forces will be resiliently transmitted from rod 2 to body 1 via shoulder 15 of rod collar 16, washer 13, resilient means 9, washer 12, and a shoulder 33 provided by the clevis-encircling end wall of body 1 (or, if car R moves away from car F, then in the reverse direction from the body to the rod via the resilient draft connection just described). Since washer 13 will thus be separated from cage 20, no thrust will be exerted on the balls 19 during draft forces. Also, spring 30 will act through control element 25, shoulder 31, and cage 20 to maintain said cage in contact with a shoulder 34 in body 1; and since the balls 19 and said element will not move relative to each other during draft forces, wear of said balls and element will be positively prevented.

During buffing forces, car R will move relatively toward car F and operatively cause rod 2 to be moved inwardly relative to body 1. Buffing forces will normally be resiliently transmitted from body 1 to rod 2 via cam-surface-defining end 24, balls 19, cage 20, washer 13, resilient means 9, washer 12, and in shoulder 14 (or if car F moves toward car R, then in the reverse direction through the resilient buffing connection just described). As the body 1 and rod 2 thus move relatively toward each other (whether due to movement of the body relative to the rod or vice versa), the spring 30 will tend to maintain the cage 20 in contact with shoulder 34 and thus prevent movement of element 25 relative to the balls 19, and hence wear thereof, as the distance between the side 29 of collar 16 and the surface 32 of said element decreases an extent corresponding to the magnitude of the buffing force.

However, if the buffing force exceeds a predetermind high value, collar 16 will be moved relatively toward element 25 a distance sufficient to successively bring end 29 of said collar into abutting contact with surface 32 of said element and then, through such contact, shift element 25 rightward relatively to the balls 19 and cage 20 until the recess 28 and balls are substantially transversely aligned; whereupon, as the element 25 is shifted further rightward, the power stored in the hitherto compressed resilient means 9 will act through washer 13, and cage 20 to cam the balls angularly downward along cam-surface 24 and into the recess, thereby effectively unlatching the balls from body 1 and also latching said cage to element 25 because the wall of bore 21 rightward of notch 22 will now act to hold balls 19 in said recess. As soon as the balls 19 latch the cage 20 to element 25, the resilient means 9 will be effectively "caged" or, in other words, its bias action will be nullified, because it will at both ends operatively contact parts then rigidly connected to the rod 2. More specifically, and as shown in FIG. 2, one end of resilient means 9 will operatively bear against rod shoulder 14 through washer 12 and the opposite end will operatively act against end 29 of rod collar 16 through washer 13, cage 20, balls 19 and element 25 in the manner above described. Also, the spring 30 will be effectively "caged" because its one end will bear against rod portion 17 and the other end will bear against element 25 which, in turn, abuts end 29 of collar 16.

Hence, as soon as the balls 19 become unlatched from body 1 and latched to element 25, no further compression of resilient means 9 or spring 30 will occur because both of the latter will be caged. This will permit the rod 2 and body 1 and hence cars F and R to move further relatively toward each other without opposition from resilient means 9 and through whatever distance is necessary to permit the anti-climber plates 35 at the adjacent ends of these cars to engage and take the thrust to reduce the possibility of telescoping the cars. During this further movement, the washer 12, resilient means 9, washer 13, cage 20, balls 19, and element 25 will be locked to rod 2 and moved in unison therewith relatively to body 1.

After the abnormally high buffing shock is dissipated through the anti-climber plates 35, the various components will remain in the respective positions in which they are shown in FIG. 2 because resilient means 9 and spring 30 will remain caged. However, the draft apparatus can be restored to normal position, as shown in FIG. 1, by applying a draft force to either of the cars F or R to cause the members 1, 2 to be moved relatively apart. During such draft force, collar 16 will be moved relatively away from element 25, and spring 30 will tend to maintain surface 32 of said element in contact with collar end 29, thereby initially moving said element, balls 19, cage 20, washer 13, resilient means 9 and washer 12 leftward in unison with rod 2 relatively to body 1, as permitted by the degree of leftward movement of collar 16. When the balls 19 are transversely aligned with notch 22, cage 20 will hit stop shoulder 34, stopping further leftward movement of the cage relative to the body 1. Spring 30 will then act through control element 25 and its cam surface 27 to cam the balls angularly outward of recess 28 and into notch 22 as said element is moved leftward by said spring relative to cage 20 and into contact with stop shoulder 31. This will effectively unlatch said balls from element 25 as they are completely ejected from recess 28 and will relatch said balls to the body 1 as surface 26 moves into contact with said balls. When the balls 19 become relatched to the body 1, the resilient means 9 will be uncaged and act through shoulder 14 to help move rod 2 further leftward and thereby move collar 16 out of contact with element surface 32. When this resetting draft force is relieved, the draft apparatus will once again be in the normal condition in which it is shown in FIG. 1.

Figure 3:
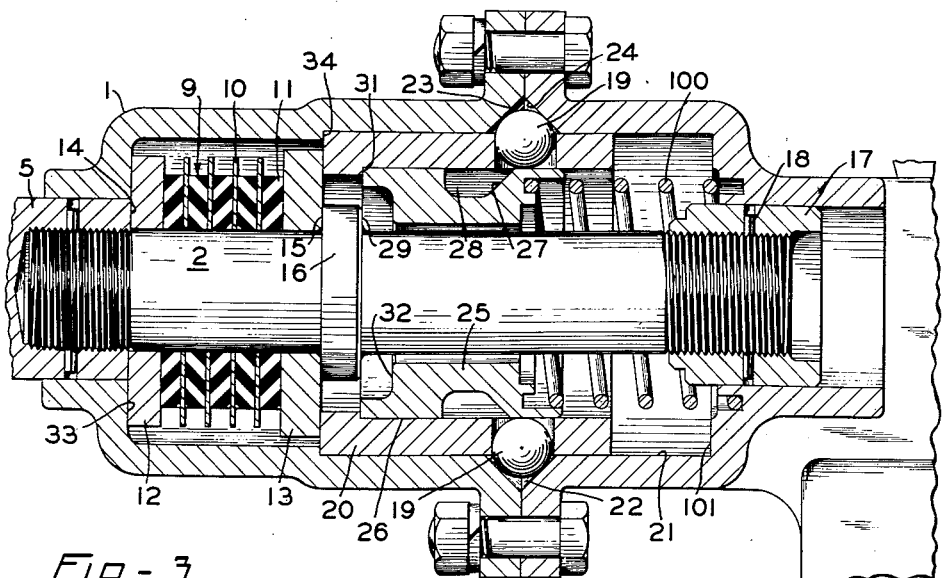
FIG. 3 is a partial section view of the draft apparatus embodying a release means constructed according to another embodiment of the invention and shown in normal position.

*Description—FIG. 3*

The draft apparatus according to this embodiment differs from that shown in FIGS. 1 and 2 in that there is substituted, for the spring 30 which bears against rod portion 17, a helical spring 100 that instead bears against a seat encircling rod portion 17 and provided in the end wall 101 of body 1. Accordingly, the same reference numerals as were used in FIGS. 1 and 2 have been used in FIG. 3 to designate components of this embodiment of the draft apparatus which are identical or substantially identical with corresponding components in FIGS. 1 and 2.

Draft forces and buffing forces less than the aforementioned predetermined high value will be transmitted between the members 1, 2 in the same manner as described in connection with FIGS. 1 and 2 and without any wear of the balls 19 or control element 25. Also, during buffing forces exceeding said high value, the balls 19 will be ejected from body 1 and into recess 28 of element 25 in consequence of the rightward shifting of said element relative to the balls through contact of rod collar 16 with element surface 32. However, since spring 100 bears against body end wall 101 rather than rod portion 17, it will be apparent that the action of spring 100 will not be nullified when collar 16 abuts element surface 32; and hence element 25 will be shifted rightward relative to balls 19 against resistance of said spring for helping to dissipate buffing energy by a degree dependent upon the opposition of said spring. The members 1, 2 can move relatively toward each other up to a maximum distance limited by either the compressed solid spring 100 or the contacting of the end of cage 20 with end wall 101, whichever occurs; and hence this maximum distance should obviously be so designed that the anticlimber plates 35 are engageable in the presence of abnormal buffing forces.

Assume now that the buffing energy or shock has been dissipated following engagement of the anti-climber plates 35. If the preselected value of spring 100 is great enough, it will act automatically to restore the draft apparatus to normal condition in which it is shown in FIG. 3, without requiring a resetting draft force such as required with the arrangement disclosed in FIGS. 1 and 2, provided of course that the buffing force was not so excessive as to damage cars F and R to a degree precluding such automatic resetting by preventing movement of said cars apart. More specifically, after such energy is dissipated, spring 100 will act to shift element 25 and hence the balls 19, cage 20, washer 13, resilient means 9, washer 12 as well as rod 2 and its collar 16 leftward initially in unison relative to the body 1. As element 25 moves leftward, balls 19 will be carried into alignment with notch 22, and cage 20 will be stopped by contact with stop shoulder 34; and then element 25 will continue to move leftward relative to the now stationary cage and balls (until it hits stop shoulder 31), causing cam surface 27 of element 25 to eject the balls from recess 28 and fully into notch 22, as element surface 26 is brought into contact with the balls. This will unlatch the balls 19 from element 25 and latch them to body 1, thereby effectively uncaging the resilient means 9; whereupon the power stored in the latter will act to restore the rod 2 to its normal position (FIG. 3) relative to the body 1 and thus move the collar 16 away from element surface 32 after further action of spring 100 is prevented by contact of element 25 with the stop shoulder 31 which, in turn, is held stationary due to contact of cage 20 with stop shoulder 34.

Thus, upon dissipation of the buffing energy, the draft apparatus will be restored automatically to normal condition, in which it is shown in FIG. 3, provided spring 100 is of sufficient preselected force to cause cars F and R to move apart if they have not been damaged by the abnormally high buffing force.

If this automatic restoration feature is not desired, the preselected value of spring 100 can be reduced to a value (substantially comparable to that of spring 30) sufficient to positively cam the balls 19 outwardly of recess 28 along cam surface 27 and into notch 22, as the cars F and R and hence the members 1, 2 are pulled relatively apart under a resetting draft force. In such case, as soon as resilient means 9 is uncaged, it will assist in restoring the draft apparatus to normal condition, in the same manner as already described.

Having now described the invention, what I claim as new and desire to secure by Letters Patent is:

1. A draft apparatus comprising, in combination, two telescopically arranged members attachable respectively to adjacent vehicles, means including resilient means and releasable latch means providing a resilient connection via which buffing forces are normally transmitted between the members, an element biased to a normal position in which it maintains said latch means operatively latched with one of said members for establishing said connection and movable longitudinally therefrom relative to said latch means to an abnormal position in which it frees said latch means for releasing said connection, and actuating means forming part of the other of said members and disengaged from said element during buffing forces of less than a predetermined value so as to be ineffective to shift said element from normal position, said actuating means during a buffing force exceeding said predetermined value being moved toward said element far enough against resistance of said resilient means to successively contact and then shift the same from normal position to abnormal position.

2. A draft apparatus comprising, in combination, two telescopically arranged members attachable respectively to adjacent vehicles, means including resilient means and a releasable latch means normally effectively latched to one of said members providing a resilient connection via which buffing forces are normally transmitted between the members, an element movable longitudinally relative to said latch means and members, means biasing said element to a normal position in which it maintains said latch means operatively latched with said one member, said element being movable to an abnormal position in which it frees said latch means for releasing said connection, and actuating means forming part of the other of said members and movable against resistance of said resilient means and toward said element a distance insufficient to shift said element relative to said latch means during buffing forces of less than a predetermined value and a greater distance sufficient to shift said element from normal position to abnormal position during buffing forces exceeding said value.

3. A draft apparatus comprising, in combination, two telescopically arranged members attachable respectively to adjacent vehicles, means including resilient means and releasable latch means providing a resilient connection via which buffing forces are normally transmitted between the members, an element arranged concentrically with and movable longitudinally relative to said latch means and said members, bias means resiliently biasing said element to a normal position in which it maintains said latch means effectively engaged with one of said members for establishing said connection, actuating means forming part of the other of said members and disengaged from said element during buffing forces of less than a predetermined value so as to be ineffective to shift said element relative to said latch means, the last introduced means upon more than a certain degree of movement of said members relatively toward each other against resistance of said resilient means in consequence of a buffing force exceeding said predetermined value being moved toward said element far enough to successively contact and then shift the latter relative to said latch means to an abnormal position in which it is ineffective to hold said latch means engaged, and means for disengaging said latch means from said one member when said element attains its abnormal position to thereby release said connection and permit substantial shortening of the apparatus.

4. A draft apparatus comprising, in combination, two telescopically arranged members attachable respectively to adjacent vehicles, resilient means interposed between said members to provide a resilient connection therebetween via which draft and buffing forces are normally transmitted between the vehicles, means including releasable latch means and a latch-means-carrying element normally positioned to establish a substantially rigid thrust connection between one of said members and one end of said resilient means during buffing forces, another element movable relative to the first mentioned element and latch means and said members and having a normal position in which it maintains said latch means in thrust-connection-establishing position and operable to an abnormal position in which it receives said latch means to release said thrust connection, means resiliently biasing said other element to its normal position, and means secured to the other of said members and normally spaced from said other element and operative only upon a predetermined degree of movement of said members relatively toward each other against resistance of said resilient means and responsively to a buffing force exceeding a predetermined amount to contact and then shift said other element relative to said first-mentioned element and to abnormal position, thereby to release said connection and permit said members to move relatively toward each other a further degree.

5. A draft apparatus comprising, in combination, two telescopically arranged members attachable respectively to adjacent vehicles, means including resilient means and releasable latch means providing a resilient connection via which buffing forces are normally transmitted between the members, an element movable longitudinally relative to said latch means and said members and having a normal position in which it maintains said latch means operatively latched with one of the members to establish said connection and an abnormal position in which it frees said latch means to release said connection and permit substantial shortening of the apparatus, spring means interposed between the other of said members and said element to bias the latter to normal position, and actuating means secured to said other member and movable toward said element during buffing forces of less than a predetermined value a distance insufficient to contact said element and during buffing forces exceeding said value a greater distance sufficient to contact and shift said element from normal position to abnormal position.

6. A draft apparatus comprising, in combination, two telescopically arranged members attachable respectively to adjacent vehicles, means including resilient means and releasable latch means providing a resilient connection via which buffing forces are normally transmitted between the members, an element movable longitudinally relative to said latch means and said members and having a normal position in which it maintains said latch means operatively latched with one of the members to establish said connection and an abnormal position in which it frees said latch means to release said connection and permit substantial shortening of the apparatus, spring means interposed between said one member and said element to bias the latter to normal position, and actuating means secured to the other of said members and movable toward said element during buffing forces of less than a predetermined value a distance insufficient to contact said element and during buffing forces exceeding said value a greater distance sufficient to contact and shift said element from normal position to abnormal position.

7. A draft apparatus of the type wherein buffing forces are normally transmitted between two concentrically arranged members via a thrust connection including latch means normally effectively engaging the outer of said members, a latch-means-carrying element, and a resilient means having one end operatively engaging the inner of said members and the opposite end operatively engaging said element, characterized by the provision of another element arranged concentrically with and disposed between and movable relative to said inner member and carrying element, means resiliently biasing said other element in the direction of said opposite end of said resilient means to a normal position in which it is normally spaced a preselected distance longitudinally from an actuating part of said inner member and maintains said latch means effectively engaged, said actuating part during buffing forces of less than a predetermined amount being moved less than said distance toward said other element to prevent relative movement and wear of said other element and latch means, said actuating part during buffing forces exceeding said amount being moved more than said distance for shifting said other element relative to said latch means from normal position to an abnormal position, and means including cam means associated with said outer member and said resilient means for forcibly disengaging said latch means from said outer member to release said thrust connection and permit substantial movement of said members relatively toward each other upon movement of said other element to abnormal position.

8. Apparatus according to claim 7, further characterized in that said inner member comprises another part spaced longitudinally from said actuating part, and said biasing means is a spring which bears against said other part and against said other element, whereby action of said spring is nullified while said actuating part contacts said other element.

9. Apparatus according to claim 7, further characterized in that said biasing means is a spring which bears against said outer member and said other element, whereby said spring will impose a bias on said other element while said actuating part contacts said other element and will absorb some of the buffing shock.

10. Apparatus according to claim 9, further characterized in that said latch means are in the form of balls, and said carrying element is in the nature of a sleeve-like perforated cage, and said other element comprises a recess and a camming surface so located that said balls will be forced into said recess in abnormal position of said other element and said camming surface will eject said balls from said recess and back into effective engagement with said outer member as said other element returns automatically to normal position under action of said spring following dissipation of said buffing shock.

No references cited.